UNITED STATES PATENT OFFICE.

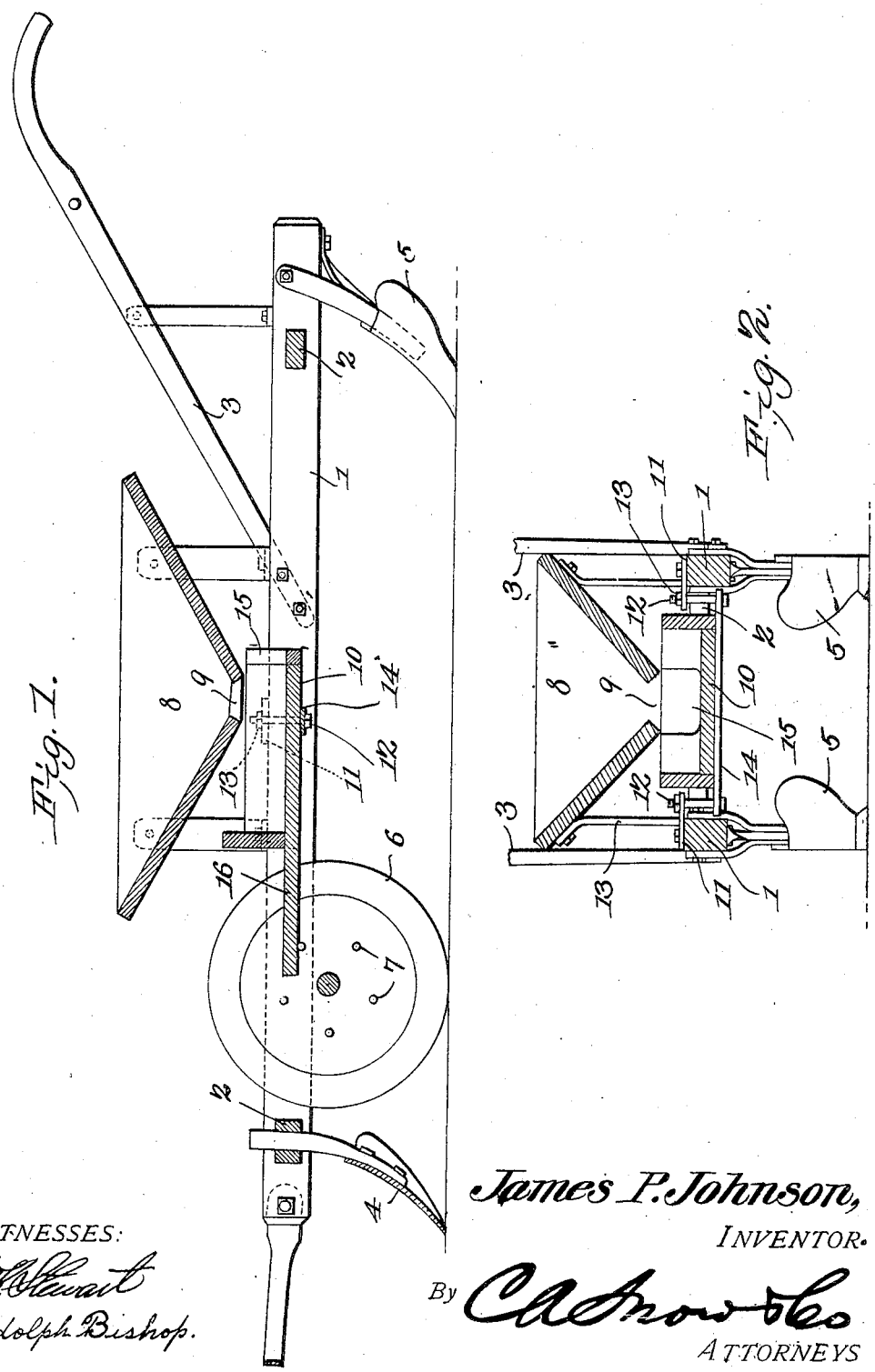

JAMES P. JOHNSON, OF HAHIRA, GEORGIA, ASSIGNOR OF ONE-HALF TO JAMES R. MILEY, OF HAHIRA, GEORGIA.

FERTILIZER-DISTRIBUTER.

No. 828,663.  Specification of Letters Patent.  Patented Aug. 14, 1906.

Application filed May 25, 1906. Serial No. 318,725.

*To all whom it may concern:*

Be it known that I, JAMES P. JOHNSON, a citizen of the United States, residing at Hahira, in the county of Lowndes and State of Georgia, have invented a new and useful Fertilizer-Distributer, of which the following is a specification.

This invention has relation to fertilizer-distributers; and it consists in the novel construction and arrangement of its parts, as hereinafter shown and described.

The object of the invention is to provide a distributer for fertilizers which is of simple and cheap construction and which will effectually distribute the fertilizer, even though it should be lumpy and contain bits of cord, straw, sticks, or other foreign articles.

In the construction of the fertilizer-distributer no valves are used. As practice has demonstrated that valves employed in such implements for the purpose of regulating the flow of fertilizer are a source of nuisance, owing to the fact that foreign substances, such as string and straw, catch in the valves and interfere with the operation of the implement. Consequently in doing away with the valves I provide for the regulation of the flow of the fertilizer by the peculiar manner in which I position a pivotally-mounted rocking shoe in relation to the outlet of a superimposed hopper. The shoe is oscillated by means of pins circularly arranged upon the side of a traction-wheel.

In the accompanying drawings, Figure 1 is a longitudinal sectional view of the fertilizer-distributer, and Fig. 2 is a transverse sectional view of the fertilizer-distributer.

The implement consists of two parallel side beams 1 1, which are connected together by the cross-pieces 2 2. The handles 3 are suitably supported upon the said beams 1, and the furrow-opening plow 4 is carried at the forward ends of said beams, and the listing or furrow-closing plows 5 5 are carried at the rear ends of said beams. The wheel 6 is suitably journaled between the said beams and is provided in one side with a set of pins 7 7, which are arranged in the form of a circle concentric with the said wheel 6. The hopper 8 is superimposed above the said beams 1, said hopper being provided at its lowest point with the outlet 9. The shoe 10 is supported below the outlet 9 of the hopper 8. Lugs 11 are attached to the beams 1 1, and the bolts 12 pass vertically through the said lugs. Said bolts are provided with the screw-taps 13, by means of which the vertical positions of the said bolts 12 may be adjusted with relation to the said lugs 11. The cross-bar 14 rests upon the heads of the bolts 12. Said bar 14 is loosely mounted upon the said bolts and is adapted to oscillate with relation to the said bolts. The shoe 10 is mounted upon the bar 14. Said shoe consists, preferably, of a rectangular box open at its top and provided in its rear side with a recess 15, which extends from the upper edge of the said side to the bottom of the box. Said recess 15 is in alinement and to the rear of the opening 9 of the hopper 8. The shoe 10 is provided with the forwardly-extending arm 16, which is adapted to engage successively the pins 7 7.

It will be observed that the outlet 9 of the hopper 8 is located above the shoe 10 at a point intermediate of the ends thereof and that the said outlet 9 is substantially vertically above the pivotal point of the said shoe.

In operation the distributer works as follows: The fertilizing material is placed in the hopper 8. The distributer is passed over the ground, the plow 4 opening a furrow, the wheel 6 rotating in said furrow, and carries the pins 7 7 around. As the forward end of the arm 16 falls from one pin upon the next pin the said forward end of the said arm 16 is elevated. Consequently the rear end of the shoe 10 descends, the bar 14 serving as a pivot for the shoe. In the meantime the fertilizer has been falling from the hopper 8 through the opening 9 into the shoe 10, and as the end of the shoe 10 provided with the recess 15 descends gradually some of the fertilizer passes through the said recess and is deposited upon the ground. When, however, the pin 7 passes beyond the end of the arm 16, the said arm and attached end of the shoe 10 descends rapidly by gravity, which throws the opposite end of the shoe 10 up with a decided jerk. This movement has a tendency to forcibly eject the fertilizer from the shoe 10 through the recess 15. By reason of the fact that the outlet 9 of the hopper 8 is located at a point intermediate of the ends of the shoe 10 the fertilizer coming from the said outlet 9 may accumulate in that end of the shoe 10 opposite the discharge end thereof. Consequently such fertilizer adds weight to that end of the shoe on the opposite side of the pivotal point thereof from the delivery end. The additional weight thus afforded facilitates the elevation of the delivery of the shoe with a sudden jerk. The arm 16 extends in the same plane as the bottom of the shoe and is, in fact, integral with the same, and as the said arm falls and strikes a pin 7 it necessarily has a tendency to rebound, which further augments distribution of the fertilizer from the delivery end of the shoe. The quantity of fertilizer distributed from the shoe 10 is regulated by vertically adjusting the position of the shoe 10 by means of the bolts 12 and taps 13. It is obvious that by raising or lowering the cross-bar 14 the angle of inclination of the longitudinal axis of the shoe 10 may be changed and so adjusted as to secure the best results for distributing the fertilizer irrespective of the condition in which the said material may be. It will thus be seen that a fertilizer-distributer is provided from which the flow of fertilizer is regulated without the use of the valves, and consequently the annoyances incidental thereto are obviated.

Having described my invention, what I claim as new, and desire to secure by Letters Patent, is—

1. A fertilizer-distributer consisting of a frame, a hopper superimposed upon said frame, said hopper having a valveless outlet, a shoe pivotally mounted upon the frame below the hopper, the outlet of the hopper being located at a point intermediate of the ends of the shoe, said shoe having at one end a delivery-outlet which is located to one side of the hopper-outlet and the pivotal point of the shoe and at its opposite end a compartment located beyond the opposite side of the hopper-outlet and the pivotal point of the shoe and adapted to receive material from the hopper, and means for oscillating the shoe.

2. A fertilizer-distributer consisting of a frame, a hopper superimposed upon said frame, said hopper having a valveless outlet, a shoe pivotally mounted upon the frame below the hopper, the outlet of the hopper being located at a point intermediate of the ends of the shoe, said shoe having at one end a delivery-outlet which is located at one side of the hopper-outlet and the pivotal point of the shoe and at its other end a compartment which is located at the opposite side of the hopper-outlet and pivotal point of the shoe and adapted to receive material from the hopper, the compartment end of the shoe normally being at a level or lower level than the delivery end of the shoe, and means for oscillating said shoe.

3. A fertilizer-distributer consisting of a frame, a hopper superimposed upon said frame and having a valveless outlet, a shoe pivotally supported upon said frame and being disconnected from said hopper, a cross-bar extending under said shoe, vertically-disposed bolts attached to said cross-bar, lugs attached to the frame and receiving the upper ends of said bolts, screw-taps engaging the upper ends of said bolts, and a means for oscillating said shoe.

In testimony that I claim the foregoing as my own I have hereto affixed my signature in the presence of two witnesses.

JAMES P. JOHNSON.

Witnesses:
 G. P. LAWSON,
 B. L. MILEY.